I. G. FLISHER & E. M. BATES.
DOUBLE SHOVEL PLOW.
No. 76,736.     Patented Apr. 14, 1868.
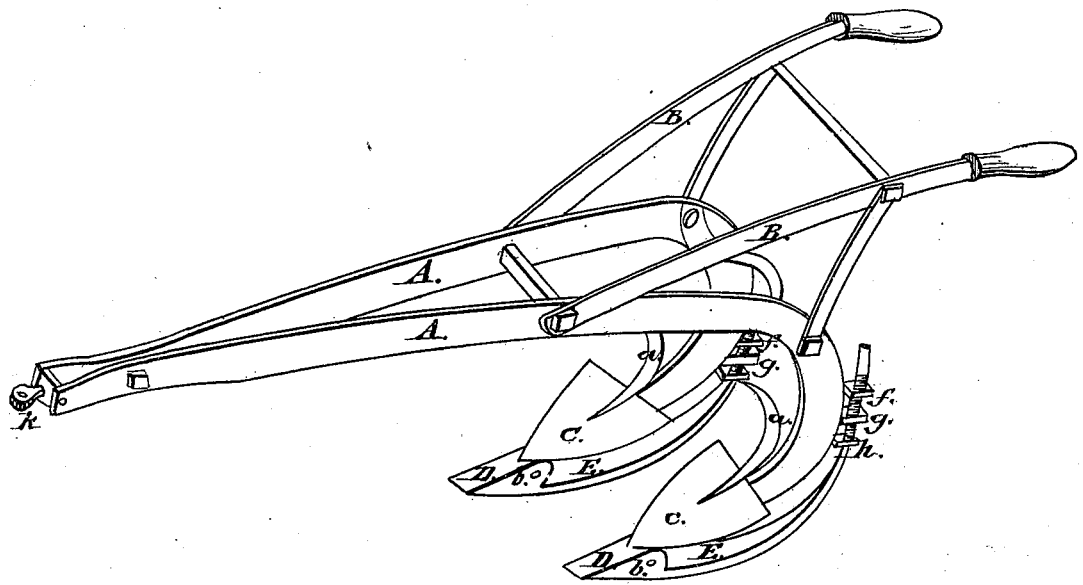
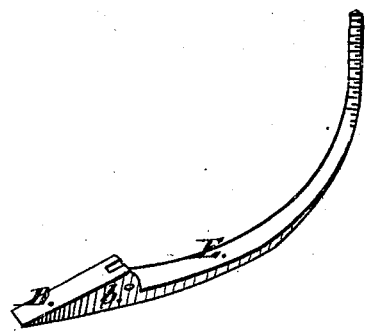

United States Patent Office.

I. G. FLISHER AND E. M. BATES, OF STARK COUNTY, OHIO.

Letters Patent No. 76,736, dated April 14, 1868.

---

IMPROVEMENT IN DOUBLE-SHOVEL PLOUGH.

---

The Schedule referred to in these Letters Patent and making part of the same.

---

Be it known that we, I. G. FLISHER and E. M. BATES, of Stark county, Ohio, have invented a new and improved Double-Shovel Plough, and hereby declare that the following is a full and exact description thereof, reference being had to the accompanying drawings, and to the letters of reference marked thereon.

The nature of our invention consists in providing the plough with an adjustable sole, by which any desired dip, no matter how slight the change, can be given to the plough without any loss of motive-power; also, in providing the plough with a knife by which briers and weeds will be easily cut and separated.

To enable others skilled in the art to make and use our invention, we will proceed to describe its construction and operation.

The beams A A, the handles B B, and the shovels C C are made as in ordinary ploughs now in use, but, instead of having the sole immovably fastened to the shovel, and always retaining the same relative position, as in Harmon's patent, in our plough the sole D E is fastened on a pivot or hinge-joint, at $b$, and curves up with the lower end of the beam, and passes through the slide $g$, and is made adjustable by means of the nuts $f\,h$, or by any other means which may be found convenient and efficient. We are thus able to give our plough any degree of dip; and when the point becomes worn off underneath, its tendency to run out of the ground is easily counteracted by a turn of the nuts $f\,h$, and this occasions no loss of the motive-power, as the position of the beam is not changed.

In Harmon's patent, and others now in use, the dip of the plough is increased by raising the guide-plates, which causes a downward drag against the ground, and a corresponding loss of motive-power. The self-adjusting swivel $k$, at the ends of the beam, dispenses with guide-plates, which is a gain in simplicity of construction. The cutters or knives $a\,a$ are so shaped, and arranged in connection with the shovels, as to prevent the plough from becoming entangled in briers or weeds.

Claims.

What we claim as our invention, and desire to secure by Letters Patent, is—

1. The adjustable sole D E, constructed and arranged substantially as and for the purpose set forth.

2. We also claim, in combination with the adjustable sole D E, the slide $g$ and the nuts $f\,h$, arranged and operating substantially as and for the purpose described.

3. We also claim the cutters or knives $a\,a$, when used in combination with the shovel $c$, substantially as and for the purpose described.

I. G. FLISHER,
E. M. BATES.

Witnesses:
JONAH WICKERSHAM,
JOSEPH COULSON.